UNITED STATES PATENT OFFICE.

PASCAL MARINO, OF REGENT'S PARK, LONDON, ENGLAND.

PROCESS OF SUPERFICIALLY METALLIZING THE SURFACE OF CAST-IRON, WOOD, GYPSUM, PAPER, AND OTHER POROUS SUBSTANCES OR ARTICLES.

1,096,177.  Specification of Letters Patent.  Patented May 12, 1914.

No Drawing.   Application filed August 27, 1912.  Serial No. 717,260.

*To all whom it may concern:*

Be it known that I, PASCAL MARINO, a subject of the King of Italy, and resident of 129 Albert street, Park street, Regent's Park, London, N. W., England, professor of chemistry, have invented a certain new and useful Process of Superficially Metallizing the Surface of Cast-Iron, Wood, Gypsum, Paper, and other Porous Substances or Articles, of which the following is a specification.

The present invention relates to a process of superficially metallizing the surface of an article made of porous material (such as cast iron, wood, gypsum, plaster of Paris, stucco, paper, compressed paper pulp, papier mâché, etc.) for the purpose of providing it with an electrically conductive surface, and the invention consists in first coating the article with an alkaline silicate in solution and then rendering the silicated surface electrically conductive by a process which is hereinafter fully described. The layer of alkaline silicate forms, when dry, a solid, very adherent, highly polished and continuous coating which closes the pores which normally are capable of absorbing a large amount of liquid.

The object of the alkaline silicate coating is to render impermeable the porous and absorbent surface of the article to be subsequently electrolytically coated so as to prevent the electrolyte from entering the pores of the material and prevent a certain amount of the metallizing solution from being imprisoned in the pores. Without this preparatory treatment the electrolytic deposit would, after a short time become pitted with small holes owing to the fact that the electrolyte in the pores would corrode and detrimentally affect the electrolytic deposit; this disadvantage being the more perceptible when the electrolytic deposit is very thin.

With the object of closing the pores of such articles it has been proposed to employ various preparations, paints, or varnishes which however possess numerous disadvantages due either to the fact that moisture and heat detrimentally affect the coating, that the preparations, paints, etc., do not completely cover the surface, do not adhere firmly to or intimately unite with the article or to the fact that, as the preparations are mixed with metallic powders, the interstices or engraved parts of the article become clogged.

A coating of an alkaline silicate possesses the following advantages:—(*a*) Owing to its fluidity the solution when applied to the article readily penetrates into the pores and, remaining therein, forms a perfect filling therefor. (*b*) Owing to its adhesive and chemical properties the articles become more dense, impermeable to water and capable of withstanding the detrimental influence of moisture, acids or high temperatures.

My process is based on:—1. The utilization of the chemical and adhesive properties of an alkaline silicate solution for the purpose of rendering the surfaces of the article more dense and impermeable. 2. The employment of a highly concentrated solution of potassium cyanid and ammonium fluorid for dissolving silver chlorid, said solution being prepared by dissolving 140 parts of potassium cyanid in water until saturation point is reached and then adding 60 parts of ammonium fluorid and 100 parts of silver chlorid, the proportions being either "by weight" or "by volume." 3. The employment of a solution of hydrazin sulfate (diamidogen) which with the addition of a suitable basic substance, such as sodium hydroxid or carbonate, acquires the property of being capable of reducing the silver chlorid to its metallic form for the purpose of rendering electrically conductive the surface coated with the alkaline silicate to permit of the electrolytic deposit thereon of metals and metallic alloys. This solution is prepared by dissolving 100 parts of undissolved hydrazin sulfate in sufficient water to obtain saturation and by then adding to the solution 60 parts (all the parts being either "by weight" or "by volume") of sodium hydroxid or carbonate.

I will now describe the process of my invention. The surface of the article is first coated (either by immersion or by direct application with a brush or other means) with two or more layers of sodium silicate solution (soluble glass). In the preparation of this solution I proceed as follows:—I dissolve one part of liquid sodium silicate (sp. gr. 1.27) in two parts of water (the parts being either "by weight" or "by volume") and coat the article once, as previously stated, with the solution. I then prepare a second solution by dissolving one part of sodium silicate sp. gr. 1.27 in one part of water and apply this solution on top of the first coat; each coating on the article treated being allowed to dry before the application of the next coating. But a greater number of coatings may be applied to the article, the precise number depending upon requirements or the state of the article. The silicated surface of the article is then coated, preferably by means of a brush, with the silver solution above referred to. This coating should be applied equally so as to leave the relief or the configuration of the article unaltered. This having been done the surface is then coated with the hydrazin solution which reduces the silver chlorid to metallic silver and forms a thin continuous pellicle on the surface of the article wherein infinitely small and mutually adherent particles of metallic silver are disseminated. The facility with which the ammonium fluorid superficially attacks the coating of alkaline silicate facilitates the penetration of the metallic silver layer into the layer of silicate with the result that the silver and the silicate adhere very strongly together and form a perfectly homogeneous coating. The surface of the article is then again wetted first with the silver solution and then with the reducing solution and is finally submitted to friction caused by a rapidly rotating brush having bristles of brass, zinc, copper, tin, aluminium, or iron for the purpose of completing the reduction of the silver chlorid and causing perfect adherence of the metallic silver to the article. The surface of the article is then ready to be coated with an electrolytic and homogeneous deposit of metal or alloy whose nature will depend upon the chemical composition of the electrolyte.

When it is desired to coat only certain parts of a metal article with an electrolytic deposit (either for esthetic purposes, the insertion of a monogram, or other purpose), such parts are not coated with the silver solution so that these parts remain unaffected when the article is placed in the bath and do not receive an electrolytic deposit.

The advantages which my process offers depend on the particular material of which the article is made. Thus in the case of an article made of cast iron the application of the process enables (a) pickling (which is always a lengthy, uncertain and often costly operation owing to the absence of homogeneity of the material due to the small quantity of carbon which it contains) to be dispensed with; (b) renders the surface of the casting even, thus increasing the purity and uniformity of the metallic deposit; (c) forms an insulator between the two metals and prevents the formation of a galvanic couple when the metallic coating has been damaged as sometimes happens on ships' bottoms when they have a coating of copper or zinc.

In the case of articles made of wood the coating, even when highly heated, does not become detached, and moreover, considerably increases the mechanical strength of the article and renders it capable of resisting the destructive action of moisture. In the case of articles made of plaster of Paris (calcium sulfate) these, after having been coated with the alkaline silicate solution and exposed to the air become covered with an insoluble calcium silicate coat which is exceedingly hard and prevents the electrolyte from becoming absorbed by the article, thus allowing the satisfactory deposition of the electrolytic deposit.

Referring now to compressed paper pulp which has hitherto been largely used in the manufacture of cannons, boats, barrels, railway rails, sleepers, pulleys, ceiling cornices, printing type, flower-vases, building blocks, etc., it is a well-known fact that the use of this material could, with advantage, have been far more extensively employed had it been possible to coat an article made of it with an electrolytic or chemically deposited layer of metal. This my process permits of, so that it finds its application in numerous industries among which may be mentioned the manufacture of machines or parts of machines for aerial locomotion, compressed paper pulp treated by my process possessing the essential properties of lightness, impermeability and high resistance to undulatory vibrations, oscillations, trepidations or strains.

Having now particularly described and ascertained the nature of the said invention and in what manner the same is to be performed, I declare that what I claim is:—

1. The herein described process of superficially metallizing the surface of an article made of a porous material for the purpose of rendering its surface a conductor of electric current which consists in the following successive steps: coating the surface of the article with an alkaline silicate in solution; coating the silicated surface with silver chlorid dissolved in a highly concentrated solution of potassium cyanid and ammonium fluorid; coating the surface with a reducing solution of hydrazin sulfate and a suitable basic substance; again coating the surface with the silver and reducing solutions, and finally submitting the deposit to friction substantially as specified.

2. The herein described process of metallizing the surface of a porous article, which consists in coating said surface with an alkaline silicate in solution, then coating the silicated surface with a silver chlorid solution containing ammonium fluorid, and then reducing the silver chlorid solution by a suitable reducing agent, substantially as and for the purpose described.

Dated this 16th day of Aug. 1912.

PASCAL MARINO.

Witnesses:
C. P. LIDDON,
GEORGE EMINTEON.